(12) United States Patent  
Sivan

(10) Patent No.: US 6,501,798 B1
(45) Date of Patent: Dec. 31, 2002

(54) DEVICE FOR GENERATING MULTIPLE QUALITY LEVEL BIT-RATES IN A VIDEO ENCODER

(75) Inventor: Zohar Sivan, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/570,806

(22) Filed: May 15, 2000

Related U.S. Application Data

(63) Continuation-in-part of application No. 09/103,405, filed on Jun. 24, 1998, now abandoned.

(30) Foreign Application Priority Data

Jan. 22, 1998 (EP) ............................................. 98480002

(51) Int. Cl.[7] ................................................. H04N 7/50
(52) U.S. Cl. .............................. 375/240.12; 375/240.14
(58) Field of Search ....................... 375/240.12, 240.14, 375/240.04; 358/426; 382/162, 166, 232, 237, 238, 240, 251; H04N 7/50

(56) References Cited

U.S. PATENT DOCUMENTS

| 5,243,420 A | * | 9/1993 | Hibi | ...................... 375/240.12 |
| 5,838,834 A | * | 11/1998 | Saito | ...................... 375/240.04 |

\* cited by examiner

Primary Examiner—Howard Britton
(74) Attorney, Agent, or Firm—Edward H. Duffield

(57) ABSTRACT

Device for generating multiple quality level bit-rates in a video encoder having a motion estimator providing a predicted block for each predefined block based upon estimating the motion between the predefined block of the current image and the corresponding block in the previous image, a transformer for transforming a prediction error resulting from the difference between the predicted block and the predefined block into the frequency domain, and a quantizer for quantizing the coefficients of the prediction error and providing the quantized coefficients to a video multiplex coding unit. Such a device includes a number n of stages, each corresponding to a quality level i=1 to n, and each stage having a computer for reducing the prediction error in accordance with the quality level i and providing a corresponding quantized prediction error residual QDi, and an adder for obtaining a cumulative prediction error:

$$QD_{TOTAL} = \sum_{j=0}^{j=i} QD_j$$

corresponding to quality level i wherein $QD_j$ is the de-quantized value of the quantized prediction error residual $QD_j$. Such a device is well suited to the current H.263 bitstream structure of the ITU recommendation H.324/H.323 by using the sub-bitstream feature without the need to change the bitstream structure.

8 Claims, 4 Drawing Sheets

DEVICE FOR GENERATING MULTIPLE QUALITY LEVEL BIT-RATES IN A VIDEO ENCODER

This application is a continuation in part of Ser. No. 09/103,405 filed Jun. 24, 1998, now abandoned and assigned to the same assignee as that of the present invention.

TECHNICAL FIELD

The present invention relates to the video encoding standard H.263 developed by the International Telecommunication Union (ITU) for very low bit-rate multimedia telecommunication and particularly to a device for generating multiple quality level bit-rates in a H.263 video encoder.

BACKGROUND

The H.263 standard developed by the ITU (International Telecommunication Union) is a part of its H.324/H.323 recommendations for very low bit-rate multimedia telecommunication. The H.263 coding scheme which is described in "Video Coding for Very Low bit-rate Communication", Draft ITU-Recommendation H.263, May 1996, is based on earlier schemes used in H.261 and MPEG-1/2 standards, and using a Hybrid-DPCM concept comprising a motion estimation/compensation mechanism, transform coding and quantization. Each image is divided into blocks of size 16×16 pixels (called macroblocks) and the macroblock in the current picture is predicted from the previous picture using motion estimation techniques. After the prediction, the macroblock is divided into four blocks of size 8×8 pixels. The prediction error is then transformed using the Discrete Cosine Transform (DCT) and the resulted coefficients are quantized and stored in the bitstream along with the motion parameters and other side information. The H.263 standard contains several improvements compared to earlier standards which allow a substantial reduction in the bit-rate while maintaining the same image quality. These improvements make it most suitable for very low bit-rate communication (but do not exclude it from being used in high bit-rate compression as well).

The H.263 bit-stream syntax defines the structure of the coded data from the basic block data to the entire image. The quality of the reconstructed video sequence can be controlled by changing the quantization step in the encoding process according to a pre-defined rate control mechanism. This allows a flexibility in generating a video sequence according to a desired bit-rate or image quality.

When a system is designed to transmit video content to a wide range of communication channels (video servers or video-on-demand), it is highly desired to be able to use one compressed video sequence which can accommodate all needs as opposed to keeping several versions of the compressed video sequence each compressed to a different bit-rate according to the target communication channel.

OBJECTS OF THE INVENTION

Therefore, the main object of the invention is to provide a device incorporated in a video encoder for accommodating a wide range of communication channels without storing several video bitstreams.

Another object of the invention is to provide a device used in a video encoder for supplying different quality level video bitstreams by using the same stored video sequence with different quantization step sizes.

BRIEF SUMMARY OF INVENTION

Accordingly, the device according to the invention is used in a video encoder comprising motion estimation means providing a predicted block for each predefined block based upon estimating the motion between the predefined block of the current image and the corresponding block in the previous image, transform means for transforming a prediction error resulting from the difference between the predicted block and the predefined block into the frequency domain, and quantizing means for quantizing the coefficients of the prediction error in the frequency domain and providing the quantized coefficients to a video multiplex coding unit, wherein the quantized coefficients are de-quantized and inverse transformed to give back the prediction error and add it to the predicted block whereby the result is provided to the motion estimation means in order to get a new current predicted block. Such a device which generates, from one video sequence, multiple video bitstreams of different bit-rates and corresponding to different quality levels comprises a number n of stages corresponding each to a quality level i=1 to n, each stage comprising computing means for reducing the prediction error in accordance with the quality level i and a corresponding quantized prediction error residual QDi, and summing means for obtaining a cumulative prediction error:

$$QD_{TOTAL} = \sum_{j=0}^{j=i} QD_j$$

corresponding to quality level i.
wherein $QD_j$ is the dequantized value of the quantized prediction error residual $QD_j$.

The invention further provides a way to efficiently store up to four compressed video sequences corresponding to up to four different quality level compression of the same video sequence.

The major advantage of the invention is to save storage space or transmission bits when this data is respectively stored as a data file or sent on a transmission line because the motion vector information are only stored once for the four different compressed video sequences. In addition, only one file (for storage) or stream (for transmission) is used as opposed to the normal case where each compressed video sequence is handled independently. One other advantage of the solution is that video decoders able to process H.263 standard bitstreams but not modified according to the new storing of data of the invention, will be however able, with no change, to reconstruct the base layer of the compressed data while discarding the rest of the sub-bitstreams it cannot decode.

BRIEF DESCRIPTION OF THE DRAWINGS

The objects, features and other characteristics of the invention will become more apparent from the following detailed description with reference to the accompanying drawings in which.

DETAILED DESCRIPTION OF THE INVENTION

Figure 1:
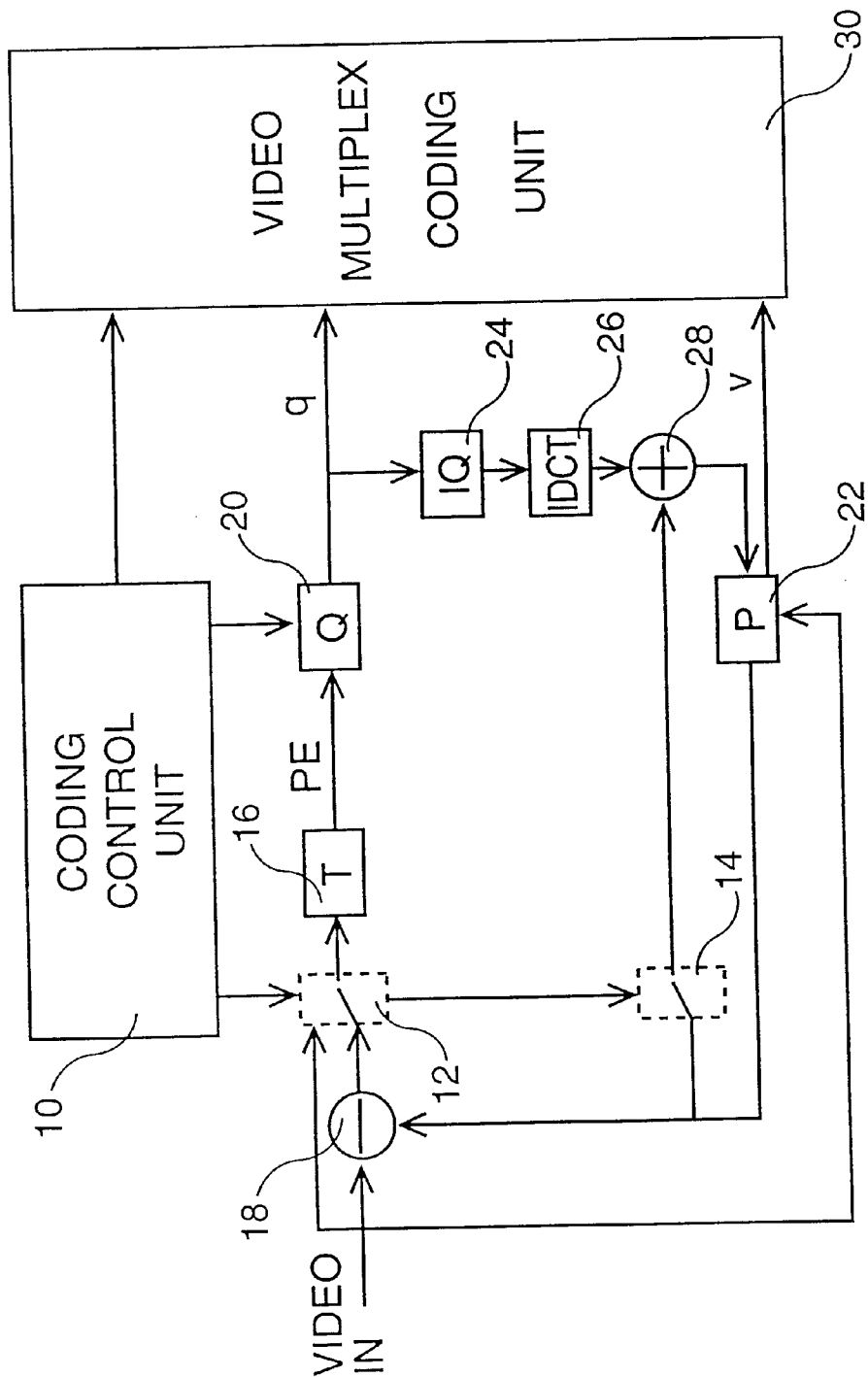
FIG. 1 represents a block-diagram of a H.263 encoder of the prior art wherein a device according to the invention is used.

The H.263 encoder in which the device according to the invention is used, is based on the hybrid-DPCM scheme which is used in most of the standard video coders today. When the encoding function has to be implemented, Coding Control Unit 10 controls switching circuits 12 and 14 as illustrated in FIG. 1 which consists in a video encoder of the prior art same as FIG. 3 of the Draft ITU-Recommendation H.263, May 1996.

The encoder is composed of a transform coder 16 which transforms a prediction error found by subtracting in subtractor 18 the current macroblock received as in input from a predicted corresponding macroblock into the frequency domain by using the Discrete Cosine Transform (DCT) in which the information is represented in a compact way suitable for compression. The DCT coefficients are then quantized in quantizer 20 with many fewer bits. This quantization, which provides a quantizing index q for transform coefficients, introduces the lossy aspect of the video encoder.

The predicted macroblock used to determine the prediction error is provided by a motion estimation unit 22 which provides motion vectors v pointing to the chosen macroblock in the previous image.

The prediction error, and the motion vectors v, form the information needed for the reconstruction process in the decoder. Indeed, the prediction of the current macroblock is performed with respect to the previous reconstructed image in a similar way as is done in the decoder to avoid any mismatch. To achieve this, a complete decoder is actually implemented in the encoder loop. All the information sent by the encoder to the decoder is coded using Hufman coding which represents the bits in a compact and efficient way. The reconstruction is performed by taking the quantized and transformed prediction error and performing inverse quantization in inverse quantizer 24 and performing inverse DCT (IDCT) in inverse Transform Coder 26. Then, the macroblock predicted from the previous reconstructed image is added to the prediction error in adder 28 to form the current reconstructed block provided to motion estimation unit 22. Note that this mechanism is performed to each macroblock of the image.

The control information from Coding Control Unit 10, quantizing index q for transform coefficients and motions vectors v are then provided to the Video Multiplex Coding Unit 30.

In the encoder of FIG. 1, the quantization performed by quantizer 20 is a process in which the DCT coefficients of the prediction error PE which can have many values in a specific range are converted into other values that are chosen from a much smaller subset in that range. The number of possible values is determined by the quantization step size. This parameter determines the number of levels in the range and hence the number of possible values that the coefficients can have after quantization.

The inverse quantization performed by inverse quantizer 24 is the inverse process in which the coefficients are transformed back to the original domain with values from that domain. The reconstructed value can be different from the original due to the quantization effect. The quantization error is computed by subtracting the reconstructed coefficients from the original coefficient values, the difference representing the error introduced by the quantization process. Note that, to be able to get back to the original domain of values, the inverse quantization step size must be identical to the quantization step size.

An essential feature of the invention is to reduce the quantization error by using several quantization stages wherein the error in each stage is reduced by decreasing the quantization step size (since the coefficients are divided by this step size). This is illustrated in FIG. 2.

Figure 2:
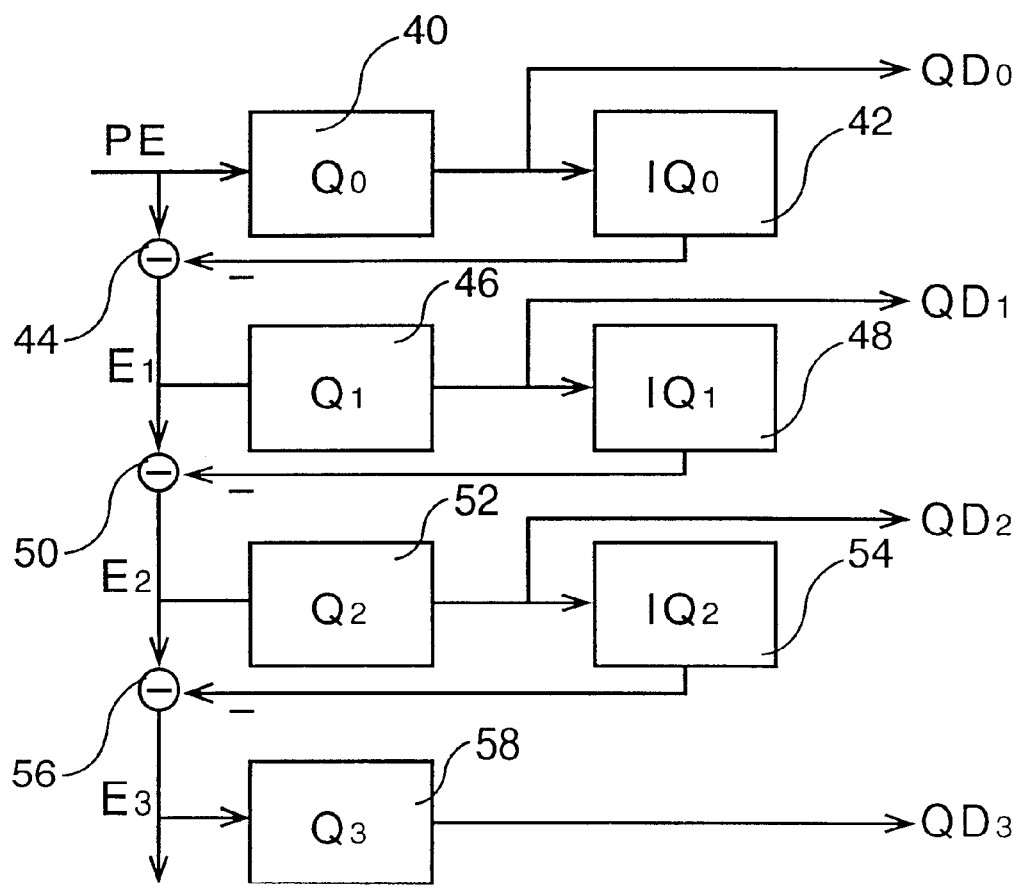
FIG. 2 is a schematic block-diagram illustrating the way of generating the quantized prediction error residuals corresponding to increased quality levels in the device according to the invention.

In FIG. 2, the coefficients of the prediction error PE (after DCT transformation) are quantized in quantizer 40 with the quantization step value $Q_0$. Therefore, $QD_0$ is a coarse representation of the DCT coefficients which would normally be used in the encoder without the invention or the quantized prediction error in the base level.

At each level i of the mechanism according to the invention, $E_i$ represents the prediction error residual as being the difference between the prediction error residual $E_{i-1}$ of level i−1 and the de-quantized value of the quantized prediction error residual $QD_{i-1}$ by inverse quantizer $IQ_{i-1}$. Thus, the de-quantized value of $QD_0$ obtained from inverse quantizer 42 (having an inverse quantization step size $IQ_0$ equal to quantization step size $Q_0$) is subtracted from prediction error PE in subtractor 44 to get prediction error residual $E_1$. Then, residual $E_1$ is quantized in quantizer 46 having a quantization step size $Q_1$, smaller than $Q_0$, in order to obtain $QD_1$ which is the quantized prediction error residual in level i=1. The de-quantized value of $QD_1$ obtained from inverse quantized 48 (with an inverse quantization step size $IQ_1$ equal to $Q_1$) is subtracted from residual $E_1$ in subtractor 50 to get residual $E_2$. $E_2$ is then quantized in quantizer 52 having a quantization step $Q_2$ smaller than $Q_1$ in order to obtain $QD_2$. The de-quantized value of $QD_2$ obtained at the output of inverse quantizer 54 (having an inverse quantization step size $IQ_2$ equal to $Q_2$) is subtracted from residual $E_2$ in subtractor 56 to get residual $E_3$. Finally, residual $E_3$ is quantized in quantizer 58 (having a quantization step value $Q_3$ smaller than $Q_2$ to obtain $QD_3$.

As can be seen in FIG. 2, at each stage, the quantized prediction error residual is computed from the prediction error residual of the previous stage. No information is lost between stages since, each time, the error between the input signal and the quantized signal is completely transferred to the next stage. The lossy nature of the compression (quantization error) is introduced only at the output of the final stage where the smallest quantization step is used and so, the error is minimal. Note that since the more stages there are, the smaller the prediction error will be, more than four stages could be used to be closer to the original prediction error.

Figure 3:
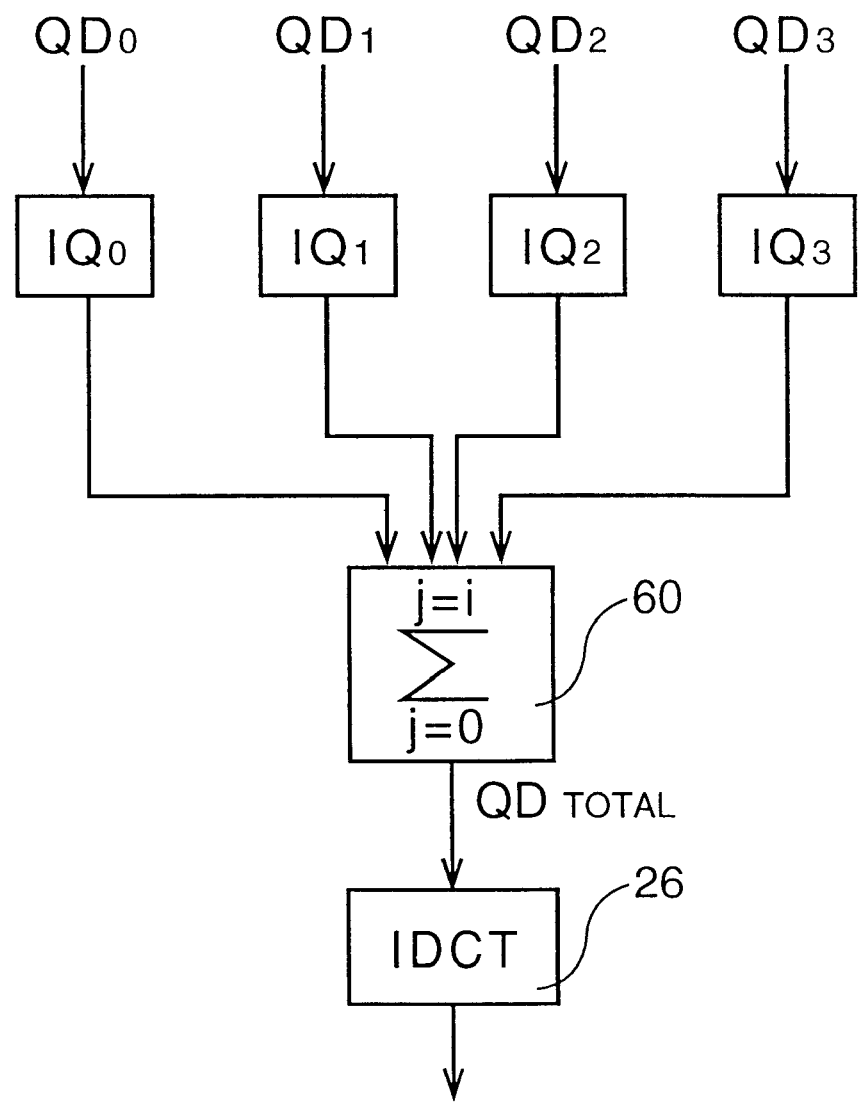
FIG. 3 is a schematic block-diagram representing the summing means of the device according to the invention for getting a cumulative prediction error.

Since the residual from the previous stage is quantized using a finer quantizer, the DCT coefficients can be rebuilt in an accumulative mechanism illustrated in FIG. 3. In such a mechanism, the de-quantized values of $QD_0$ to $QD_3$ by respectively inverse quantizers $IQ_0$, $IQ_1$, $IQ_2$, $IQ_3$, are summed in summing circuit 60 to get a value $QD_{TOTAL}$ according to $$QD_{TOTAL} = \sum_{j=0}^{j=i} QD_j$$

wherein i can take any value 0, 1, 2, or 3. The quantized value $QD_{TOTAL}$ is then de-quantized in inverse transform coder 26 as usual.

Thus, the rebuilding mechanism can stop at any level i if the desired bit-rate or picture quality has been achieved (according to the restrictions of the communication channel or the decoder at the other end). In the present case, $QD_{TOTAL}$ can be obtained by using $QD_0$ alone, or $QD_0+QD_1$, or $QD_0+QD_1+QD_2$ or $QD_0+QD_1+QD_2+QD_3$. In this way, up to four versions of the same compressed video sequence can be produced from one bitstream. It must be noted that $QD_0$ being the base prediction error and $QD_1$, $QD_2$, $QD_3$ being components of the errors, when these components are added to $QD_0$, the result is closer to the original value before quantization. In other words, the greater is i in the above formula giving $QD_{TOTAL}$, the better will be the quality of the video image.

Figure 4:
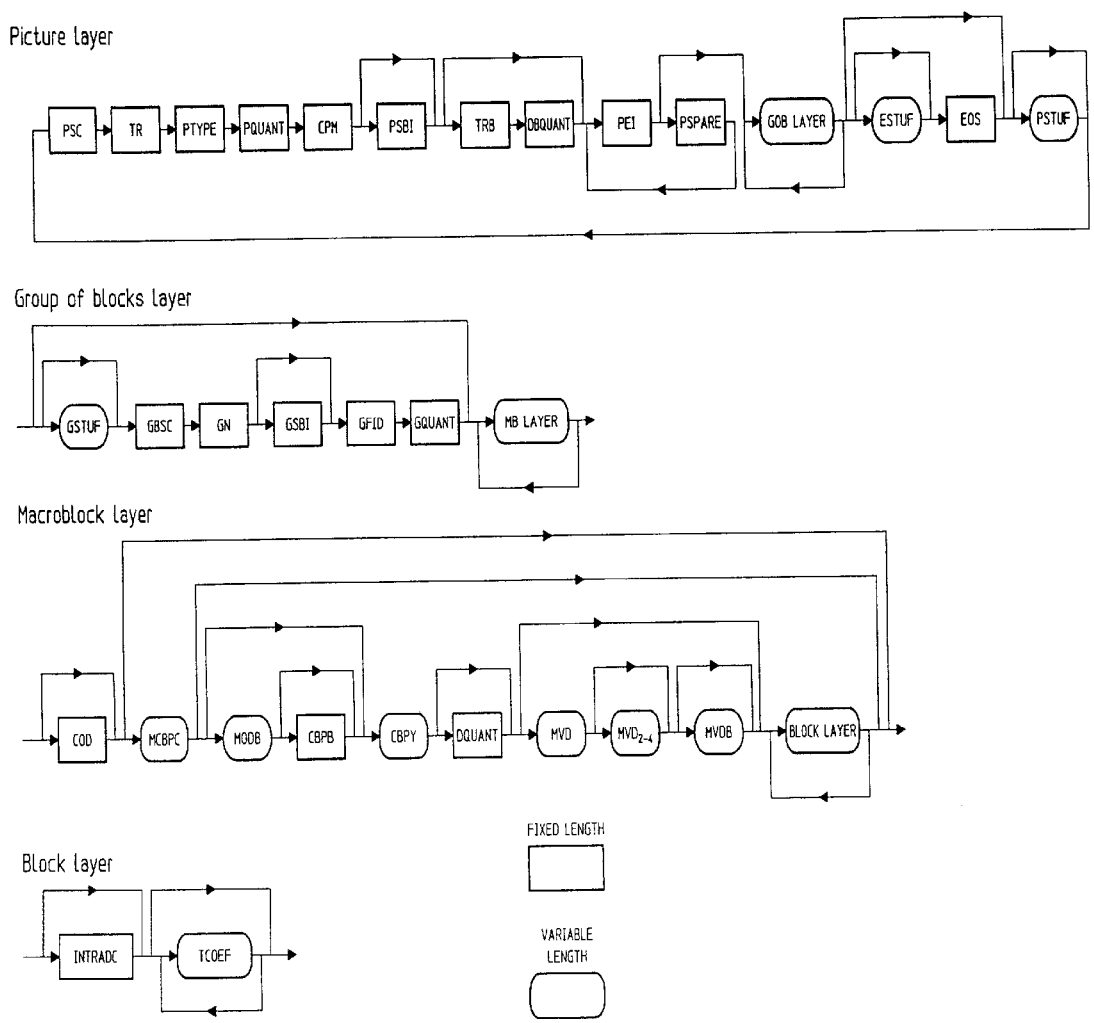
FIG. 4 shows the bitstream data structure according to the H.263 May 1996 draft being the support for storing four quality levels of the same video sequence according to the invention.

In the preferred embodiment of the invention, up to four different compressed video sequences corresponding to up to four different quantization step sizes can be stored as a unique video sequence. This is done by using the existing bitstream and sub-bitstream structure of a compressed video sequence as defined by the H.263 standard but applied to specific data. This data structure can be used to store efficiently this multi-level video sequence as a data file or to transfer it on a transmission line. With this embodiment, one can use the ability of the H.263 coder to handle up to four sub-bitstreams without the need to change the bit-stream structure. Such a structure is described in "Video Coding for very Low bit-rate Communication", ITU-T Recommendation H.263, May 1996, The data structure defined by H.263 standard is illustrated in FIG. 4. The picture layer is the upper layer the other data structures 'Group Of Blocks layer', 'Macroblock Layer' and 'Block layer' are embedded one in the other for providing all the video pixel block information for all the blocks of a picture. One bit (CPM) indicates the usage of sub-bitstreams. Then, two bits which are present if the CPM bit if activated, allow up to four independent sub-bitstreams to be defined within the total H.263 bitstream. Picture Sub Bitstream Indicator (PSBI) are two bits which are present only if CPM is indicated. They indicate that the picture header and all following information until the next picture of Group of Blocks (GOB) headers belong to the same sub-bitsream. Group Sub Bitstream Indicator (GSBI) are two bits which are present only if CPM is activated. They indicate that the GOB header and all following information until the next picture or GOB start code belongs to the same sub-bitstream. This mode is provided to transfer up to four independent bitstreams: annexe C in H.263 standard draft, May 1996, states that 'The information in each individual bitstream is also completely independent from the information in the other bitstreams'.

The video encoder of the preferred embodiment of the invention generates the multi-quality level information and stores up to four quality level encoded video sequences of the same video sequence as four sub-bitstreams in a unique H.263 bitstream. For the preferred embodiment, the use of CPM bit in the H.263 bitstream means that there are multiple quality level information included as sub-bitstreams. PSBI qualifies which quality-level it is. The GSBI field will indicate to which quality-level the following group of blocks belong. The Macroblock Layer and Block Layer have the same use than with the usual H.263 bitstream, these are the macroblock and block encoded information.

Note that the motion vectors information which accompany each macroblock should be stored only in the base bitstream. This information is used by all the other sub-bitstreams. Quantization information is stored in the usual way for each sub bit-stream (if needed, according to the rate-control mechanism used by the coder). The only macroblock information included in the sub-bitstreams apart for the base one are the quantized residual values, so the overhead of using the sub-bitstream structure and the proposed scaleability mechanism is minimal.

The decoder of the preferred embodiment receives the bitstream as described and is able to use some or all of the bitstreams to reconstruct the video sequence at a quality (or bit rate) which matches the decoder needs. If, according to the bandwidth of the communication channel used, only a subset of the bitstream can be sent by the video encoder through the communication channel, the video decoder will reconstruct the video sequence at a quality which will match the channel bandwidth.

What is claimed is:

1. In a video encoder comprising motions estimation means (22) providing a predicted block for each predefined block based upon estimating the motion between said predefined block of a current image and the corresponding block in a previous image, transform means (16) for transforming a prediction error resulting from the difference between said predicted block and said predefined block into the frequency domain, and quantizing means (20) for quantizing coefficients of the prediction error in the frequency domain and providing the quantized coefficients to a video multiplex coding unit (30), wherein said quantized coefficients are de-quantized (24) and inverse transformed (26) to give back said prediction error and add it to said predicted block whereby the result is provided to said motion estimation means in order to get a new current predicted block;

a device comprising means for generating from one video sequence, multiple video bitstreams of different bit-rates and corresponding to different quality levels, said device further comprising:

means for building a hierarchical H.263 bitstream including at least one and up to four substreams each corresponding to one different quality level generated from said video sequence, a CPM bit of the H.263 bitstream being set to 1, a PSBI 2 bit field being set to the number of different quality level substreams stored, a first Group Of Block comprising a 2 bit field GSBI being set to the first quality level bitstream, the corresponding Macroblock layer comprising MVD, MVD2, MVD3, MVD4, MVDB bit fields storing motion information generated from said video sequence for said first quality level bitstream, following Group Of Blocks comprising a 2 bit field GSBI being set to the value corresponding to the range of the following quality level bitstreams wherein the corresponding Macroblock layer MVD, MVD2, MVD3, MVD4, MVDB bit fields do not store motion information.

2. Device according to claim 1 further comprising:

a number n of stages, each said stage corresponding to a quality level i=1 to n, each said stage comprising computing means for reducing the prediction error in accordance with said quality level i and providing a corresponding quantized prediction error residual $QD_i$, and summing means for getting a cumulative prediction error $$QD_{TOTAL} = \sum_{j=0}^{j=i} QD_j$$

corresponding to quality level i.
wherein $QD_j$ is a dequantized value of the quantized prediction error residual $QD_j$.

3. Device according to claim 2, wherein said computing means in each one of said stages comprise:

means for determining a prediction error residual $E_i$ corresponding to quality level i, said residual being the difference between prediction error residual $E_{i-1}$ of quality level i−1 and the de-quantized value of the quantized prediction error residual $QD_{i-1}$ obtained in the stage corresponding to quality level i−1, and quantizing means for quantizing said prediction error residual $E_i$ according to a quantization step size smaller than the quantization step size of the stage corresponding to quality level i−1.

4. Device according to claim 3, wherein said quantizing means in each stage corresponding to quality level i is a quantizer (40, 46, 52 or 58) having a quantization step size $Q_i$ smaller than the quantization step size $Q_{i-1}$ of the stage corresponding to quality level i−1.

5. Device according to claim 4, wherein in each stage corresponding to quality level i, the quantized prediction error residual $QD_i$ is de-quantized in an inverse quantizer (42, 48, or 54) having a quantization step size $IQ_i$ equal to the quantizer step size $Q_i$ used in quantizer of said stage.

6. Device according to any one of claims 5, wherein the input of the first stage corresponding to quality level i=1 is said prediction error and the output of said stage being prediction error residual $E_i$.

7. Device according to claim 6, wherein the de-quantized values $QD_i$ for i=0 to 3 are respectively obtained by means of inverse quantizers using the same quantization step sizes $IQ_0$, $IQ_1$, $IQ_2$ or $IQ_3$ as the quantization step sizes $Q_0$ to $Q_3$ of quantizers providing said quantized prediction error $QD_0$ and quantized prediction error residuals $QD_1$, $QD_2$ or $QD_3$.

8. In a video encoder comprising motions estimation means (22) providing a predicted block for each predefined block based upon estimating the motion between said predefined block of the current image and the corresponding block in the previous image, transform means (16) for transforming a prediction error resulting from the difference between said predicted block and said predefined block into the frequency domain, and quantizing means (20) for quantizing the coefficients of the prediction error in the frequency domain and providing the quantized coefficients to a video multiplex coding unit (30), wherein said quantized coefficients are de-quantized (24) and inverse transformed (26) to give back said prediction error and add it to said predicted block whereby the result is provided to said motion estimation means in order to get a new current predicted block;

a device comprising means for generating a video sequence from reading a bitstream of a compressed video sequence of different specific bit-rate and corresponding to a specific quality level, said device further comprising:

means for reading a hierarchical H.263 bitstream including at least one and up to four substreams each corresponding to one different bit-rate corresponding to different quality level generated from one video sequence, a CPM bit of the H.263 bitstream being set to 1, a PSBI 2 bit field being set to the number of different quality level substreams stored, the first Group Of Block comprising a 2 bit field GSBI being set to X'01' for the first quality level bitstream, the corresponding Macroblock layer comprising MVD, MVD2, MVD3, MVD4, MVDB bit fields storing motion information for said first subitstream, and the following Group Of Blocks if any, comprising a 2 bit field GSBI being set to the value corresponding to the range of the corresponding quality level bitstream, the motion information being the content of the MVD, MVD2, MVD3, MVD4, MVDB bit fields read in the first subitstream.

\* \* \* \* \*